Feb. 5, 1952     R. E. FIDLER     2,584,687
ADJUSTABLE TIE ROD
Filed Nov. 22, 1950
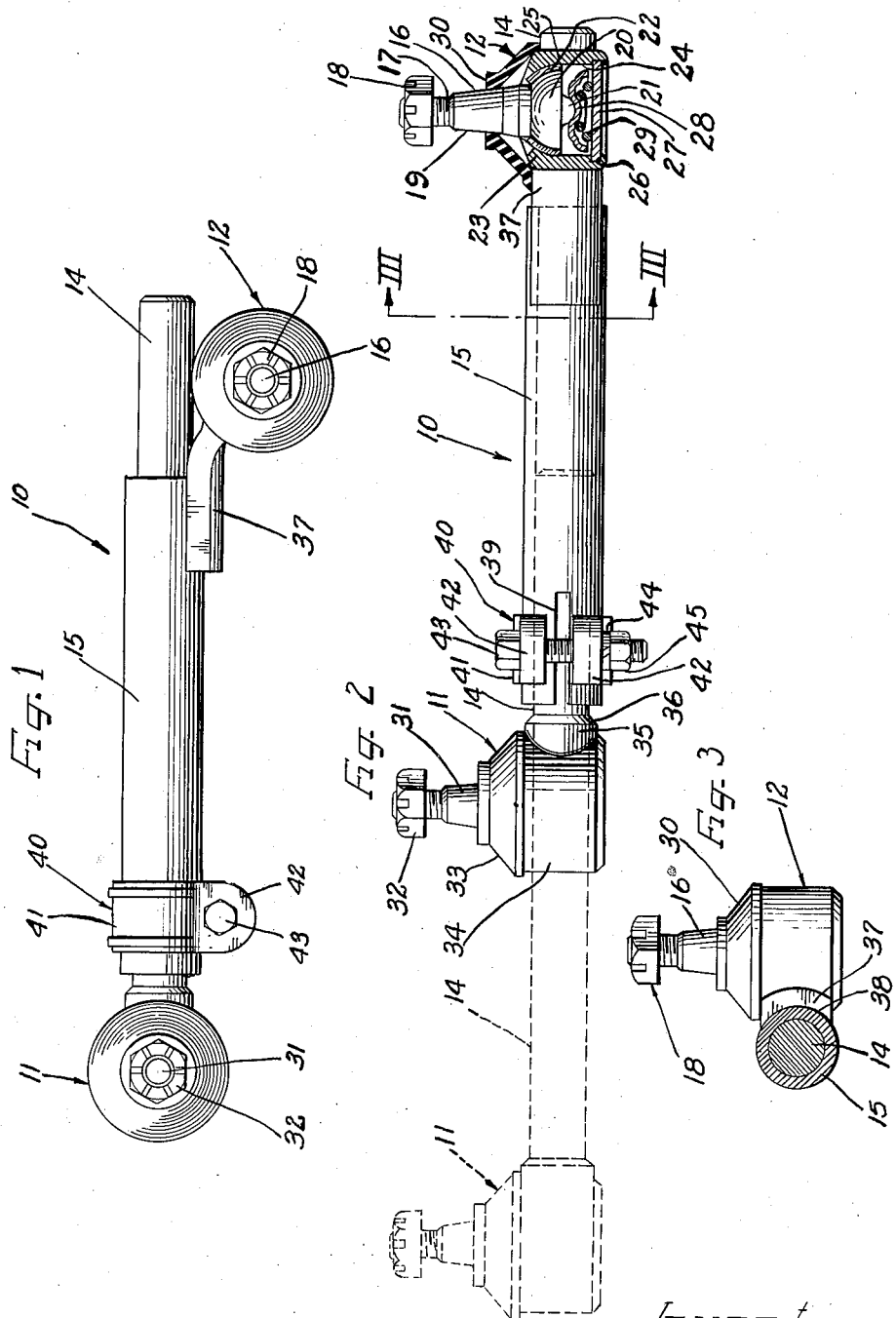
Inventor
Robert E. Fidler
by Hill, Sherman, Meroni, Gross & Simpson Attys.

Patented Feb. 5, 1952

2,584,687

UNITED STATES PATENT OFFICE 2,584,687

ADJUSTABLE TIE ROD

Robert E. Fidler, Royal Oak, Mich., assignor to Thompson Products, Inc., Cleveland, Ohio, a corporation of Ohio Application November 22, 1950, Serial No. 197,039

5 Claims. (Cl. 287—58)

This invention relates to a tie rod which is easily adjustable in length for use with vehicles where the span of the steerable wheels is adjustable.

More specifically the invention deals with a variable length two-piece tie rod having an extended length which is at least twice its shortest length and equipped with tie rod joints at each end thereof.

Some dirigible vehicles, such as row crop wheeled tractors, have front wheels which can be adjusted to vary the span thereof. Such vehicles require a tie rod which will accommodate this adjustment without any appreciable change in the rigidity of the rod between its shortest and longest positions. It is highly desirable to produce such an adjustable tie rod which is of simple but rugged construction and is economical to manufacture.

According to the present invention, a first tie rod joint has an elongated stem or shank extending from its housing into one end of an open-ended tube carrying a second tie rod joint at the other end thereof in offset relation so as not to obstruct the other open end of the tube. The stem of the first joint, in the shortest adjusted position of the assembly, can extend completely through the tube. The one open end of the tube receiving the stem is longitudinally slotted and equipped with a clamp that will contract the tube on the stem to fix the relative telescoped positions of the tube and stem. The assembly can therefore be easily adjusted to place the tie rods close together or far apart and the longest span of the assembly can be at least twice the length of the shortest span while still allowing enough telescoping of the rod and stem to insure rigidity.

It is, therefore, an object of the present invention to provide an adjustable tie rod and tie rod joint assembly wherein one joint has a housing with a shank that can extend completely through an open-ended tube carrying another joint in offset relation from the open ends of the tube.

Another object of this invention is to provide an adjustable length tie rod with joints on the ends thereof that can be positioned apart within a range having a distance which is at least twice the minimum distance.

Still another object of the present invention is to provide an adjustable length tie rod and tie rod joint assembly in which one joint housing is provided with an elongated integral shank adjustably telescoped in an open-ended tubular shank portion of a second joint.

Other and further features, objects and advantages of the present invention will become apparent to those skilled in the art from the following detailed description of the annexed sheet of drawings showing a preferred embodiment of the invention.

On the drawings:

Figure 1 is a top plan view of an assembled tie rod construction according to the present invention;

Figure 2 is a side elevational view of the tie rod shown in Figure 1 with one of the joints shown in section and with a dotted line showing how the rod may be extended;

Figure 3 is a sectional view taken along line III—III of the figure and illustrating the conforming relationship between the tubular shank and the integral tongue of one of the joints.

As shown on the drawings:

In Figure 1 is illustrated an adjustable tie rod assembly 10 having ball joints 11 and 12 at the opposite ends thereof. The ball joint 11 has an integral elongated rod-like stem or shank 14 extending through a tubular stem or shank 15 fixedly attached to the ball joint 12. The tubular shank 15 has its axis offset with respect to the joint 12 in order to allow the shank 14 of the joint 11 to pass beyond the joint 12 without interfering therewith.

Each of the ball joints 11 and 12 may be of any suitable construction such as that shown in the sectional portion of Figure 2. As seen in this view, a joint stud 16 has a threaded end portion 17 for threadedly receiving a nut 18. Adjacent the threaded end portion 17 is a tapered shank portion 19 for connecting with a tapered hole in a steering arm (not shown). The other end portion of the stud 16 is provided with an integral segmental ball 20. At the end of the stud 16 adjacent the segmental ball 20 there is provided a smaller segmental ball end portion 21 having a common center with the ball portion 20. The ball portion 20 has an annular segmental spherical insert 22 therearound which is seated in a conforming segmental spherical socket 23 formed at one end of a cylindrical chamber 24 in a joint housing 25. At the opposite end of the housing 25 is a counterbore 26 which receives a circular closure member 27 fixedly retained therein by spinning or peening the walls of the housing 25 about the outer edge portion thereof. A bearing seat member 28 has spherical indentation receiving the ball end portion 21 of the stud 16 in spherical bearing relationship, and a conically-shaped coil compression spring 29 is operatively disposed between the bearing seat member 28 and the closure member 27 to urge the mating bearing surfaces into proper bearing contact. A sealing cap 30, which may be of resilient material such as rubber, is disposed over the end of the housing 25 which contains the socket 23 and has the end of the stud 16 extending therethrough. Thus, the stud 16 is retained in rotatable, universally tiltable relationship within the housing 25.

The joint 11 has a stud 31, a nut 32, a cap 33, and a housing 34 similar to the corresponding parts of the joint 12. The rest of the joint 11 may be constructed in a manner similar to that described in connection with the joint 12.

The rod-like shank 14 of the joint 11 is substantially perpendicular to the stud 31 therein. The shank 14 may be rigidly formed with the housing 34 as by machining or forging, or the portion may be formed separately and welded to the housing to form an integral unit. Between the housing 34 and the shank 14 is formed a short shank portion 35 of somewhat larger diameter forming an abutment shoulder 36 to prevent the end of the tubular shank 15 of the joint 12 from contacting the housing 34.

For attaching the tubular shank portion 15 of the joint 12 to the housing 25 in offset relationship thereto in order not to block the passage through the tubular portion, the housing 25 is provided with an offset tongue-like shank 37. The shank 37 has a segmental cylindrical surface 38 extending substantially tangentially with respect to the outer side surface of the housing. The cylindrical surface 38 has its cylindrical axis substantially perpendicular to the stud 16 of the joint 12. The integral shank 37 is fixedly attached to one end portion of the tubular shank 15 as by welding with the cylindrical surface 38 in conforming relationship with the adjacent surface of the cylindrical shank. Thus, the side of the outer surface of the cylindrical shank 15 toward the housing 25 is in a generally tangential line with respect to the corresponding outer side surface of the housing and the cylindrical shank is rigidly fixed with respect to the joint 12. Hence, the joint 12 does not block the passage through the tubular shank 15, and therefore the end portion of the shank 14 of the joint 11 may move beyond the joint 12 without interference until the opposite end of the tubular shank 15 abuts the shoulder 36 formed at the inner end of the shank 14 in order to provide the shortest length between the joints 11 and 12.

The end of the tubular shank 15 adjacent the joint 11 is provided with a longitudinal slot 39. A split ring clamp assembly 40 having a split ring-like bight portion 41 and a pair of integral opposed generally radially extending ears 42 is disposed over the slotted end portion of the tubular shank 15 with the bight portion 41 in conforming relationship thereto. A bolt 43 is inserted through the ears 42 and is provided with a lock washer 44 which is retained by a nut 45 threadedly engaging one end portion of the bolt 43. Thus, the split ring clamp assembly 40 may be radially contracted about the slotted end portion of the tubular shank 15 by tightening the nut 45 on the bolt 43 to urge the ears 42 toward one another. Hence, the slotted end portion of the tubular shank 15 will be contracted about the adjacent surface of the shank 14 to provide a rigid non-sliding, non-rotating connection therebetween.

The tie rod assembly 10 may be adjusted in length from a length slightly shorter than that shown in solid lines in Figure 2 to a length somewhat greater than that indicated by the dotted lines in Figure 2 in conjunction with the solid showing of the joint 12. The ring clamp assembly 40 serves to maintain the adjusted portion in fixed relationship. The outer surface of the shank 14 and the mating inner surface of the tubular shank 15 may be smooth as shown or they may be provided with any suitable type of engaging means such as threads, serrations, etc.

From the above description it will be readily apparent that the present invention provides an improved and simplified adjustable length tie rod and tie rod joint construction.

It will be understood that modifications and variations may be effected without departing from the scope of the novel concepts of the present invention.

I claim as my invention:

1. An adjustable length tie rod for a vehicle embodying adjustable span steerable wheels comprising an open-ended tube having a longitudinally slotted end portion, a joint having a housing with a stud rotatably and tiltably retained therein, said joint housing having a fixedly attached tongue with a segmental cylindrical face extending generally tangentially from the joint housing, said tongue being fixedly attached to the unslotted end portion of said tube with the cylindrical tongue surface in conforming contact with the adjacent surface of the tube to position the joint housing in offset relation from the unslotted open end of the tube, a second joint having a housing with a stud rotatably and tiltably retained therein, said second joint housing having an elongated rod-like shank portion rigidly attached thereto and extending laterally therefrom into the slotted end of the tube, said shank adapted to extend completely through and beyond the tube, and a clamp on the slotted end portion of said tube to contract said end about said shank for effecting a fixed connection therebetween.

2. An adjustable length tie rod and joint assembly having a maximum span at least twice the length of its minimum span comprising an elongated rod, an elongated tube receiving said rod in telescoping relationship, a first tie rod joint fixedly attached to one end of said rod, a second tie rod joint fixedly attached to an end portion of said tube opposite to said first joint, said second joint being out of alignment with the passage through said tube to accommodate projection of the rod through the tube beyond said second joint, and means for contracting a portion of said tube about said rod to retain the rod and the tube in fixed adjusted relationship.

3. An adjustable length tie rod comprising a joint having a housing with a stud rotatably and tiltably retained therein and having a laterally extending elongated stem, a second joint having a housing with a stud rotatably and tiltably retained therein and having a laterally extending tongue, an elongated tube fixedly mounted along the side thereof to said tongue and receiving the stem in telescoping relation therein, and means for retaining said stem and said tube in fixed adjusted relationship.

4. An adjustable tie rod for a vehicle embodying adjustable span wheels comprising a first ball joint having a laterally extending elongated stem, a second ball joint having a laterally extending elongated tubular shank receiving the stem in telescoping relation, the axis of said second joint being offset from the axis of said tubular shank to permit the end portion of said stem to protrude out of said tubular shank beyond said second ball joint without interference therewith, and means for fixedly securing said first joint stem within said tubular shank.

5. An adjustable length tie rod and joint assembly comprising a first joint having an elongated fixedly attached solid shank portion, a second joint having an elongated fixedly attached tubular shank portion receiving said first joint solid shank portion therein in conforming relationship therewith, said second joint being offset with respect to the tubular shank portion to allow the end portion of the solid shank portion to protrude out of the tubular shank portion beyond said second joint, the other end of the tubular shank portion having a longitudinal slot therein, and a contractible split ring clamp disposed about said slotted end portion for contracting the same about the solid shank portion to maintain a selected fixed relationship between said joints.

ROBERT E. FIDLER.

REFERENCES CITED

The following references are of record in the file of this patent:

UNITED STATES PATENTS

| Number | Name | Date |
| --- | --- | --- |
| 1,795,747 | Viken | Mar. 10, 1931 |
| 2,049,502 | Hufferd et al. | Aug. 8, 1936 |
| 2,544,185 | Sargent | Mar. 6, 1951 |